(12) United States Patent
Friedman

(10) Patent No.: US 7,216,931 B2
(45) Date of Patent: May 15, 2007

(54) ROLLOVER SAFETY SEAT

(75) Inventor: Keith Friedman, Santa Barbara, CA (US)

(73) Assignee: Friedman Research Corporation, Santa Barbara, CA (US)

( * ) Notice: Subject to any disclaimer, the term of this patent is extended or adjusted under 35 U.S.C. 154(b) by 222 days.

(21) Appl. No.: 10/877,176

(22) Filed: Jun. 28, 2004

(65) Prior Publication Data

US 2006/0006719 A1   Jan. 12, 2006

(51) Int. Cl.
*B60N 2/42* (2006.01)
*B60R 21/00* (2006.01)

(52) U.S. Cl. .............................. 297/216.1; 297/216.13

(58) Field of Classification Search ........... 297/362.11, 297/217.3, 216.13, 216.1
See application file for complete search history.

(56) References Cited

U.S. PATENT DOCUMENTS

| | | | |
|---|---|---|---|
| 5,203,600 A * | 4/1993 | Watanabe et al. | 296/68.1 |
| 5,492,368 A * | 2/1996 | Pywell et al. | 280/806 |
| 6,053,571 A * | 4/2000 | Faigle | 297/216.13 |
| 6,076,887 A * | 6/2000 | Andersson | 297/216.1 |
| 6,474,734 B1 * | 11/2002 | Masuda et al. | 297/216.13 |
| 6,720,750 B2 * | 4/2004 | Stachowski et al. | 318/466 |

* cited by examiner

*Primary Examiner*—David R. Dunn
*Assistant Examiner*—Tania Abraham
(74) *Attorney, Agent, or Firm*—Mark Rodgers

(57) ABSTRACT

This invention is vehicle seat, which provides enhanced occupant protection in the event of a vehicle rollover. The seat includes a rollover sensor and mechanisms compatible with manual reclining seats. These mechanisms allow for rapid reclining of the seat during a rollover, by unlocking the reclining mechanism and automatically reclining the seat.

26 Claims, 5 Drawing Sheets

ROLLOVER SAFETY SEAT

BACKGROUND OF THE INVENTION

The invention relates to vehicle seats, particularly seats for automobiles and light trucks, but is also applicable to heavy vehicles or aircraft. The seats of this invention will provide increased occupant protection in the event of a rollover accident, or other situations requiring repositioning of the head/chest. Rollover accidents occur relatively slowly compared to other accidents, such as front, side, or rear impacts. Thus rollover accidents can utilize additional design techniques to achieve occupant protection. Rollover occupant protection system design involves the integration of a number of components in the vehicle, all of which must be compatible with each other. One element of the vehicle available to vehicle designers in developing effective rollover occupant protection system designs is the seat with integral restraint. One element of the vehicle that is particularly hazardous to restrained occupants is the intruding roof. This invention moves the occupant's head and chest away from the vehicle roof automatically during a rollover.

It has been known in the art for some time, recognized by the inventors for almost ten years, that an important tool available to designers of occupant safety in a rollover, along with, for example, stronger roof structures, better occupant packaging, more effective restraint systems, active or passive rollbars and other available technology, is to dynamically move the occupant away from the roof before the roof crushes. In large vehicles such as semi-truck cabs, there is room to move the entire seat straight down a large distance away from the roof, and several approaches for this problem have been proposed. In co-pending application, Ser. No. 10/807,325, by the same inventor, three concepts for accomplishing rollover protection in light passenger vehicles with power (electric) integrated seats (all-belts to seats) are identified: dynamically tilt the seat back rearward in order to effectively move the occupant's head away from the roof and rearward in the vehicle, reorienting the torso-head/neck complex to a more advantageous position and orientation; compress the seat back and seat cushion to be smaller than their normal dimensions to increase headroom in conjunction with rollover actuated pretensioning seatbelts; and, under certain circumstances move the seat cushion forward or rearward or laterally to better position the occupant relative to the roof structure and/or to allow for the downward deployment of the seat back in restricted compartment space conditions. However, many vehicle seats do not have powered adjustment for reclining. The current invention addresses rollover safety for seats without power reclining capability.

Although solutions to some of the concepts have been previously proposed, none have been implemented in light vehicles to date. As described in co-pending application, Ser. No. 10/807,325, the existing solutions are not compatible with power adjustable seats. However even for non-powered seats, previously proposed solutions are not, in fact, practical, because they do not address characteristics of real manual seat designs either.

The reclining mechanism on almost all manual seats includes a ratchet, gear, or scissor type positioning mechanism, where a mechanical stop is engaged in a detent. This stop is manually moved by a lever or other release mechanism. The seat is moved to the desired position, and then the stop is re-engaged in different detent, holding the seat in the desired position. In addition, many seats have stops that limit the reclining motion. Both the limiting stops and adjustment stops, typically, should be strong mechanically. Existing solutions for rollover protection that rely on reclining the seat back to move the occupant away from the roof do not address the issue of the recliner adjustment or limiting stops, and therefore cannot be implemented in conventional seat designs.

BRIEF SUMMARY OF THE INVENTION

The invention is a seat for a vehicle, the seat having a seat back and a seat cushion. The seat includes means for manual adjustment of the seat reclining position, including a mechanism which locks the seat in the desired reclining position. The invention includes a first actuator, which reclines the seat, a second actuator which unlocks the reclining mechanism (and mechanisms/actuators etc for subsequent control of the seat in terms of how far rearward it can go, and mechanisms/actuators/sensors to prevent the return of the seat back towards a more upright position), and a rollover sensor. In response to a signal from the rollover sensor indicating the vehicle is in a rollover condition, the reclining actuator and the unlocking actuator are engaged, such that the seat is rapidly reclined rearward. Further embodiments of the invention also include occupant sensing for additional control of the seat motion.

In another embodiment of the invention, the seat may have a recline position stop, and an actuator to move the stop (or remove the stop allowing a subsequent stop to become effective). In response to a signal from the rollover sensor indicating the vehicle is in a rollover condition the recline position stop is removed by the actuator, such that the seat can be reclined beyond the normal stop position. In some vehicle seats, a stop may be introduced to prevent the seat from reclining past the required position.

The actuators may have any combination of pyrotechnic pistons, motors, or spring loaded designs. The spring loaded actuator includes a spring, and a solenoid, pyro, or motor, which drives a release mechanism, such that in normal vehicle operation the spring is held in an extended or compressed position by the mechanism. In response to a signal from the rollover sensor, the mechanism is removed from the spring, freeing the spring to retract or compress. One such mechanism may be a pin.

The preferred seat of the invention also includes an integrated safety belt, with a pre-tensioner. The pre-tensioner is triggered in response to a signal from the roll-over sensor.

In another embodiment, the seat is held in the reclined position after the operation of the actuators in response to the rollover signal. In one version of this embodiment, the seat is held in the reclined position by re-engagement of the unlocking mechanism. The unlocking mechanism may be re-engaged by an additional actuator, which re-engages the mechanism, the additional actuator triggered by a timer that is set to a time sufficient to allow for the seat to recline. The actuator may also be triggered from a measurement of the seat's position, for instance by rotary encoder. Or the locking mechanism may be re-engaged by the release of the mechanism by the second actuator, after a time sufficient for the seat to recline. Alternatively, the seat may be held in the reclined position by the operation of another actuator which inserts a restraining device to secure the seat in the reclined position. In a further embodiment the motion of the seat past a trip point engages a stop, which is released to swing or move into position when the seat reaches the desired position.

BRIEF DESCRIPTION OF THE DRAWINGS

The detailed description of how to make and use the invention will be facilitated by referring to the accompanying drawings.

DETAILED DESCRIPTION OF THE INVENTION

Figure 1:
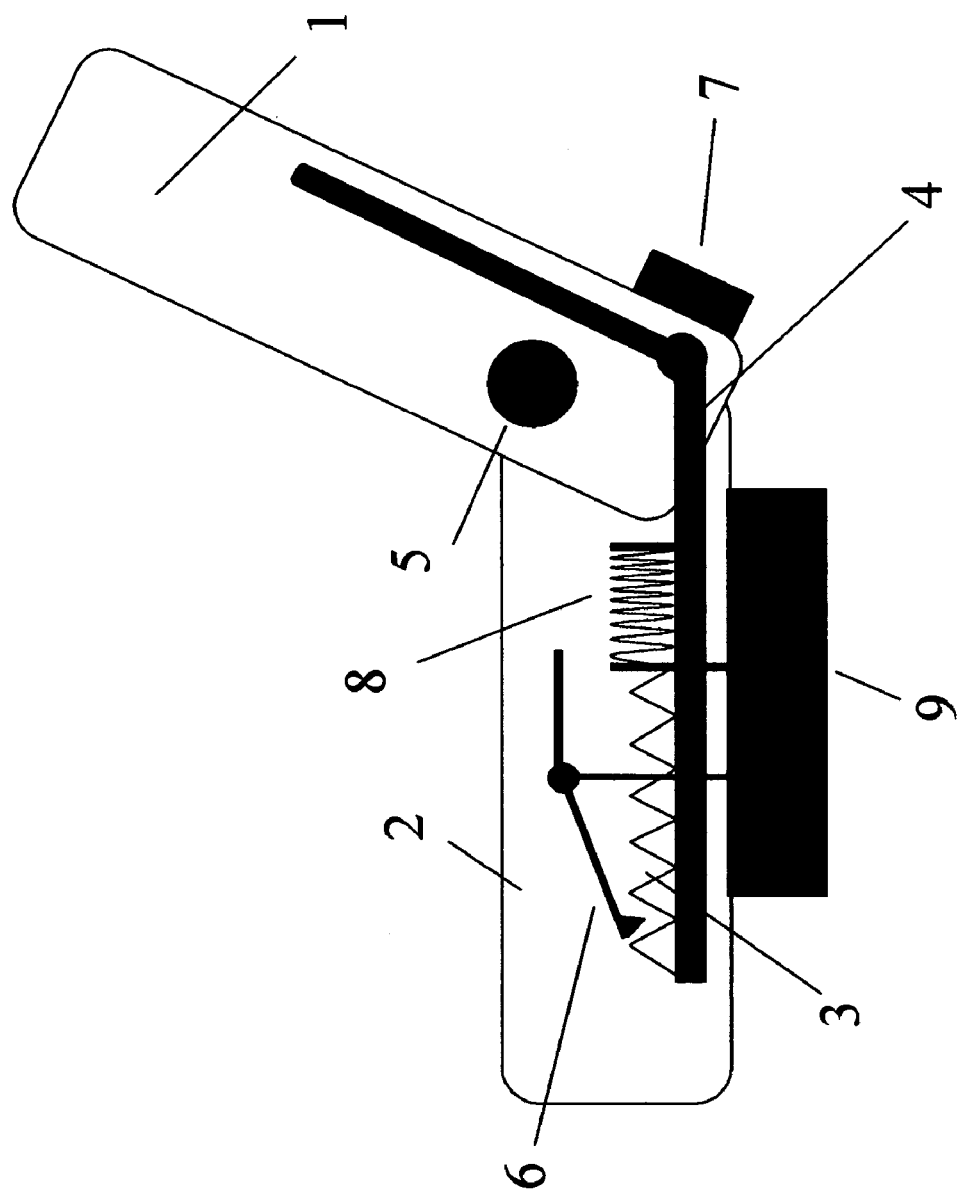
FIG. 1 depicts the major elements of a generic vehicle seat suitable for practice of the invention.
Figure 2:
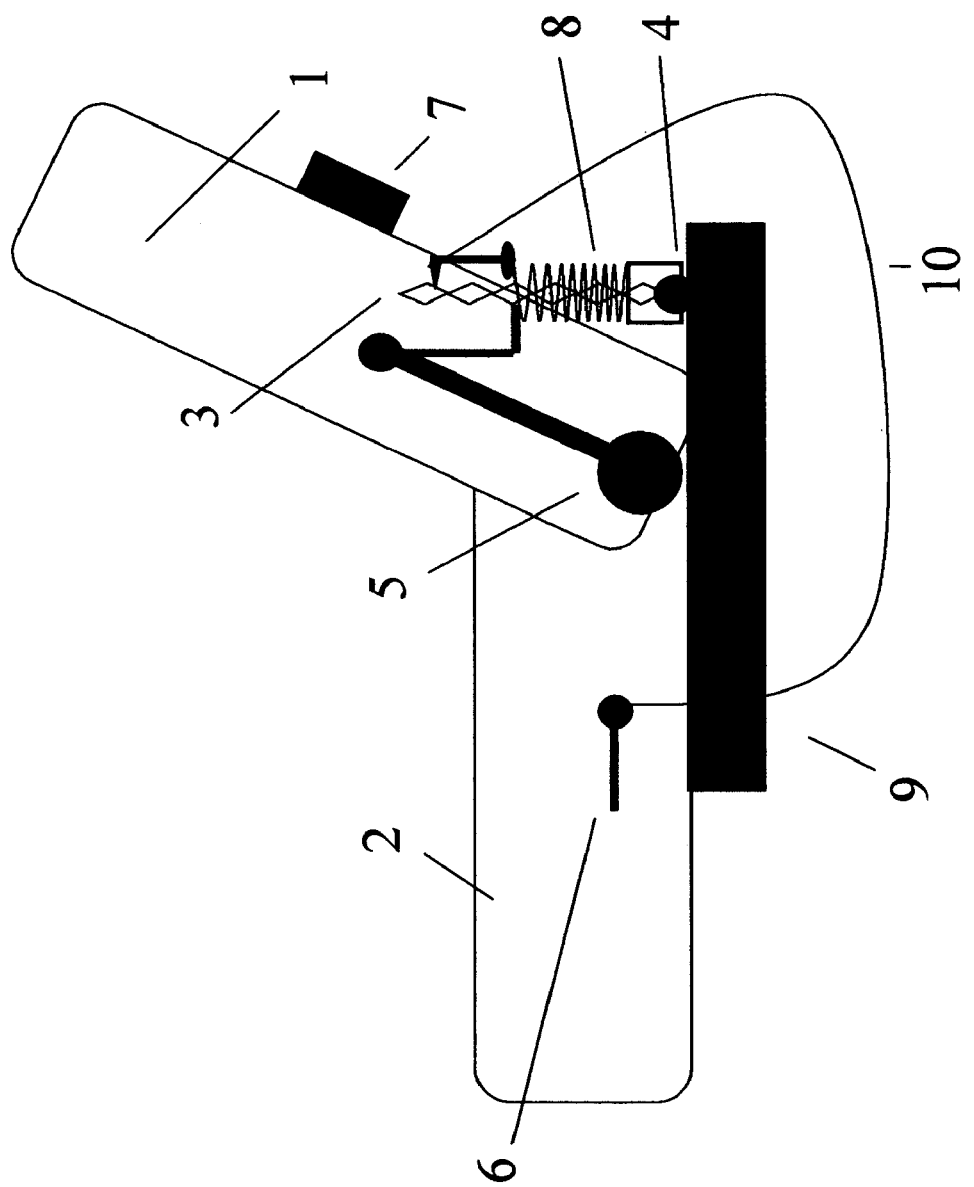
FIG. 2 depicts the major element of another exemplary seat design

Referring to FIG. 1, the seat consists of a back, 1, and a cushion 2. A manual reclining mechanism is shown is schematic form. A row or some other arrangement of detents or stop positions is shown at 3. The seat back rotates about pivot point, 5. 3 is connected to the seat back through pivotal member 4, constructed such that motion of the member in the forward/reverse direction causes the seat back 1 to rotate about the pivot point 5. A spring 8 is attached rigidly to the seat frame 9 on one end and to the member 4 on the other. When the locking mechanism 6 is released, the spring pushes the member rearward, causing the seat back to rotate forward. The passenger uses his weight to recline the seat backward against the spring 8, and re-engages the locking mechanism when the seat is in the desired position. In addition some seat designs may have a stop 7, which either intentionally, or non-intentionally limits the range of the recline motion. Another example of a manual reclining seat is shown in FIG. 2. In this case, the spring 8 pushes up to cause rotation about the pivot point 5. The locking mechanism consists of a lever on the side of the seat that attaches a cable 10, which pulls a retainer away from the detent member 3. It is to be understood that a wide range of manual reclining mechanisms exist. Some may have the lever on the seat back, at the rotation point, or other positions. The locking mechanism as well may take different forms. The exact design of the seat is not critical to the invention, as the invention is compatible with many seat designs. The nature of the stop, if one exists is also not critical. A skilled designer of such seats will understand how to apply the invention to a particular seat design from this disclosure. In addition, for seats with manual reclining, but other adjustments of the powered type, all of the features of co-pending application Ser. No. 10/807,325 may be practiced for the powered portions, while the current invention is practiced for the reclining motion.

Figure 3:
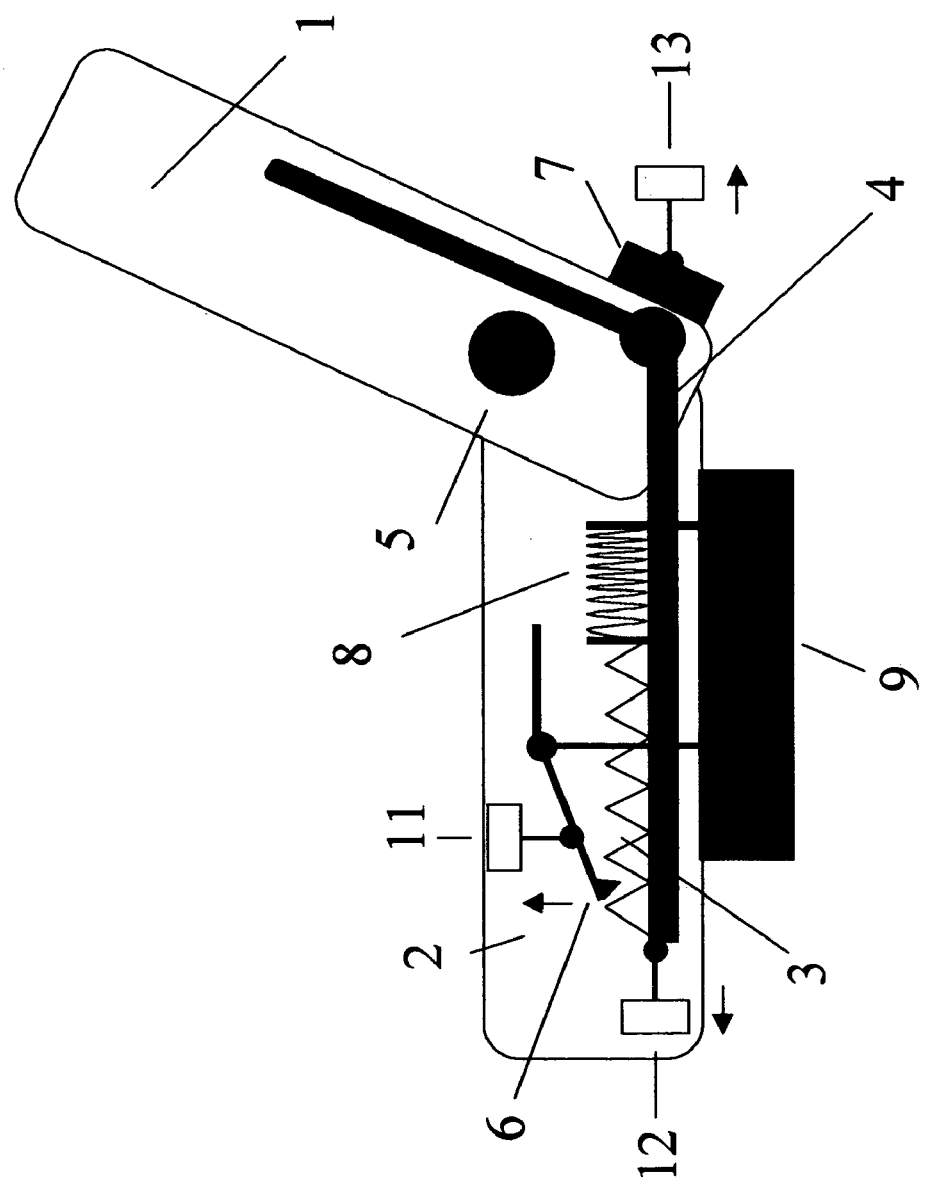
FIG. 3 shows the elements of the invention for the first exemplary seat.
Figure 4:
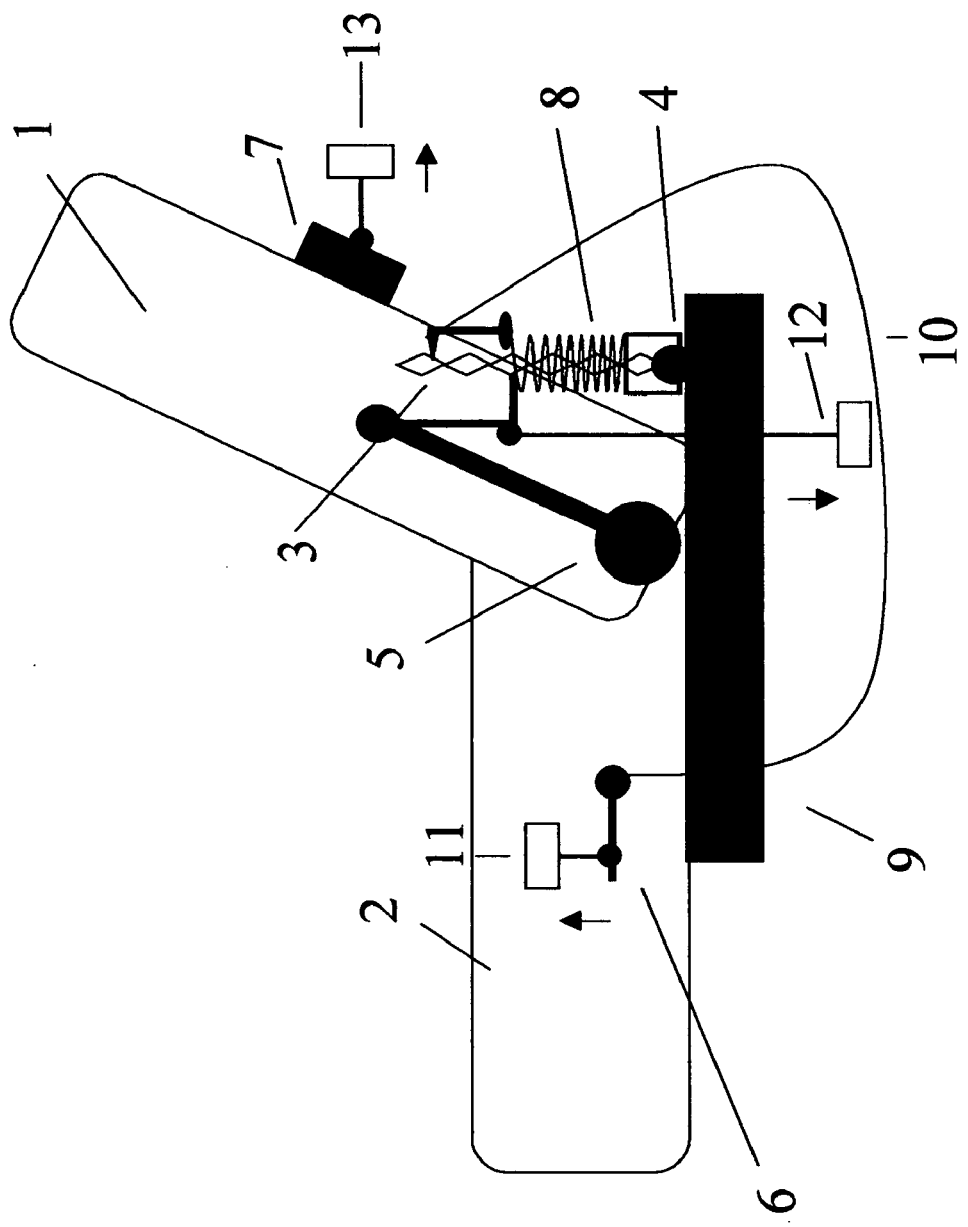
FIG. 4 illustrates the elements of the invention for the second exemplary seat.

Referring to FIG. 3, the elements of the invention are added to the seat. An actuator, 11 is connected to the locking mechanism 6 and 3. Another actuator 12 is configured to recline the seat. An optional actuator 13 is configured to move the stop 7. FIG. 4 shows the elements 11, 12, and 13 arranged for the second exemplary seat design. It is to be understood that the locking mechanisms in manual reclining seats can be very strong, and must be released before a seat can be reclined by an actuator. It may be desirable to remove spring 8's resistance to reclining motion as well. This could be accomplished by removing one or both surfaces that spring 8 act against, either by actuator or simply blowing the action surface with a charge. Alternatively, the spring itself could be blown or rendered ineffective by pyro or chemical means.

The invention requires a rollover sensor in the vehicle, which may or may not be integrated with the seat. Rollover sensor designs exist in the art, which are suitable for use with the invention. For purposes of implementing the invention, a particular rollover detector sensor may be used as long as the sensor is capable of discriminating between normal operation, and a wide enough range of roll conditions to ensure that a signal indicating immediate rollover will not be generated other than during a real rollover event.

Referring to FIG. 3, in response to the rollover sensor signal, actuator 11 engages, releasing the locking mechanism. Actuator 12 engages, in such a way, or at such a time, that it is not pulling against the locking mechanism, i.e. time phased such that 11 is adequately engaged. Actuator 12 causes the seat to recline. The Figure shows a seat where just the back reclines, but it is understood that in some seats both the back and cushion rotate. The result is that the seat reclines rapidly, moving the occupant's head and chest away from the roof, and critically, the locking mechanism is released, allowing for reclining to take place. Optionally, if desirable, any limiting stop 7 may also be moved, actuator 13, allowing for more than normal reclining in the event of a rollover. For some vehicles, a stop 7 may be inserted to prevent excess reclining.

The invention is best implemented in combination with a seat belt, integrated with the seat. The seat belt should have at least one pretensioner, known in the art, which is also triggered by the rollover signal.

Figure 5:
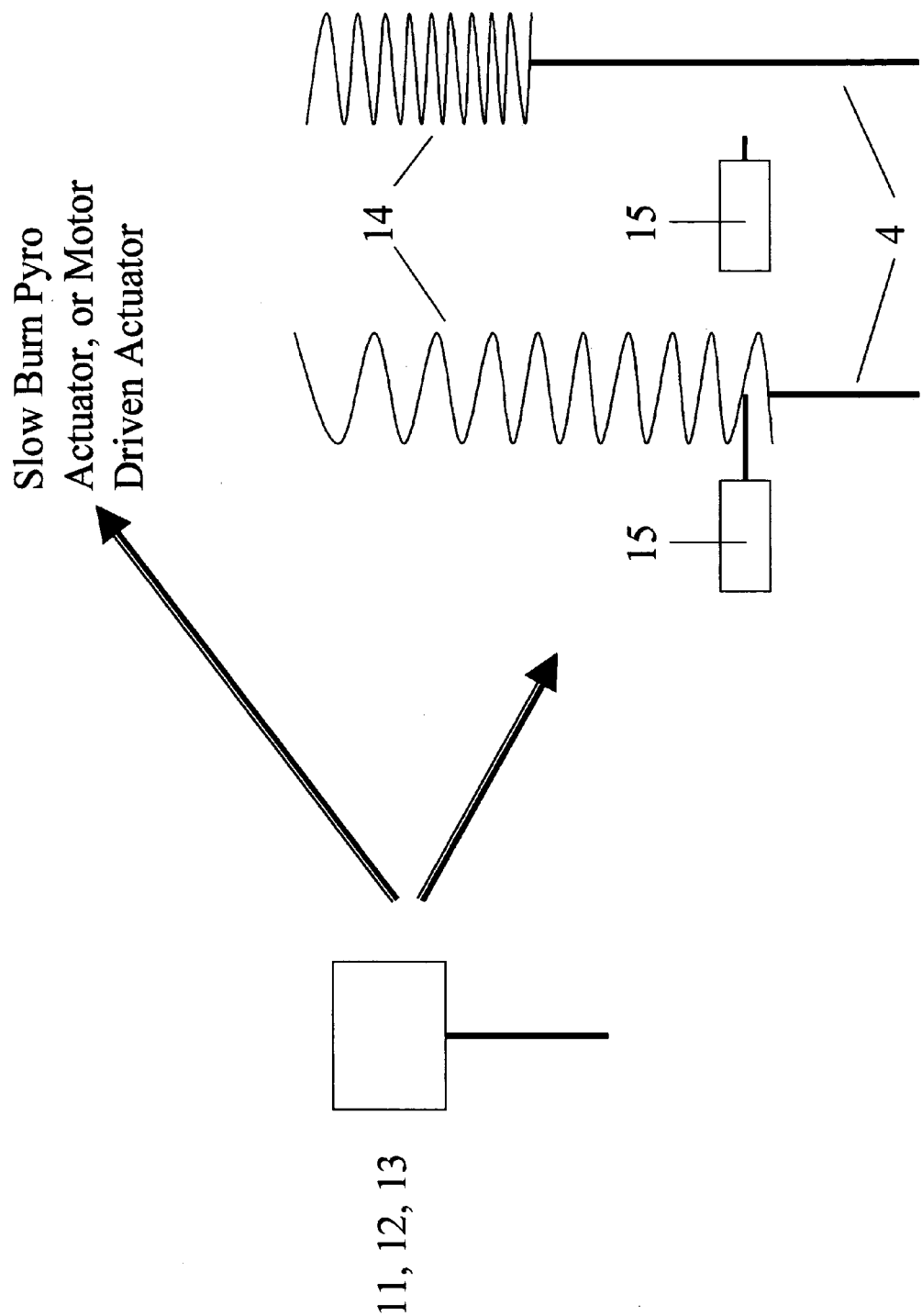
FIG. 5 shows possible implementations of the actuators, particularly the spring loaded type.

Referring to FIG. 5, variety of actuators may be employed at 11, 12, and 13. For example, pyrotechnic pistons are used in automotive applications in similar applications such as seat belt pretensioners. In this application, the rollover signal triggers the pyro charge, which drives the piston shaft. The shaft could be connected to the locking mechanism 6 and 3, reclining mechanism, 4, and stop 7 in the invention. Slow burn pyro devices would be preferable for this application, since large masses are being moved, including the occupant. Therefore the reclining motion should not be too fast. Rollover events take place slow enough that there is time to recline at an occupant safe rate. Also, a motor drive actuator could also be employed at any of 11, 12, or 13.

Another actuator mechanism contemplated by the inventors is shown in FIG. 5. A suitably strong spring 14 is held pinned in the extended (or compressed) position by a solenoid device 15. Motor or pyro actuators could also be employed at 15. The spring may be attached, for example, to the reclining members 4. The solenoid is actuated by the rollover signal, removing the restraining mechanism, such as a pin, freeing the spring, thereby accomplishing the desired motions. The case where the spring is held extended is shown in the figure, but the spring held compressed is also contemplated by the invention. Any combination of spring, motor, or pyro actuators may be used for any of the actuators described in the invention, as well as other suitable actuators within the scope of the invention.

Depending on the type of actuator used and the design of the seat, the invention may require additional features to work properly. Some seat/vehicle designs have no rear limit to the reclining motion, allowing for seats to recline to a fully flat or even beyond-flat position. This position is not ideal from a safety standpoint during a rollover accident. Therefore for this type of situation, a stop needs to be inserted to limit the range of reclining motion during a rollover condition. The insertion of the limiting stop may be accomplished by another actuator. Alternatively, the stop may be configured such that when the seat reaches the desired position, the movement of the seat past that point releases the stop to engage. One example would be to insert a pin(s) into a hole(s) in the seat frame when the seat reached the desired position. Another example of such a mechanism would be a bar on a spring loaded pivot configured such that when a part of the seat frame with an opening slides past the bar, the bar pivots into the opening, restraining the seat at that point in the reclining motion. Stops of this type would require that they lock into place when deployed. A variety of stop designs and suitable actuators, including those already described, will be obvious to skilled designers for particular seat/vehicle configurations.

Depending on the type of reclining mechanism used, provision may be required to keep the seat in the reclining position once reclined. As stated above, most reclining seats are configured such that the reclining spring 8 rotates the seat forward when the locking mechanism is released. The reclining actuator once engaged, may not be strong enough to overcome the spring, and any other forces, such as crash accelerations, once the reclining motion is over. For instance, pyro pistons may have insufficient reverse resistance once the charge is blown. One approach to keeping the seat reclined is to simply re-engage the locking mechanism once the seat is reclined. Many recliner locking mechanisms are spring loaded such that when the operator releases the handle, the mechanism re-locks. The locking mechanism release actuator may be set up with a timer such that the lock is released after a time sufficient for the seat to recline. Alternatively, the seat rotation may be measured with a rotary encoder or other electronic means connected to a circuit, which re-engages the lock at the appropriate position. An actuator of the solenoid type is particularly amenable to a timer or measured position approach, since the solenoid is turned on and off by control signals. For actuators of the pyro type, whose operation cannot be reversed as with the solenoid type, another actuator may be employed to re-engage the locking mechanism. Not all recliner lock mechanisms designs will reliably re-engage however when released. For these cases, another actuator may be used to insert a reverse motion stop once the reclining motion is complete. This stop would have the opposite effect as the motion-limiting stop described above. Or the restraining systems above that deploy when the seat reaches a certain position would be equally effective at keeping the seat reclined as limiting the amount of recline. Again, many different designs would suggest themselves to a skilled designer.

As vehicle protection becomes more sophisticated, smart safety systems will become prevalent that measure the presence of occupants as well as their size and weight, along with monitoring the type of accident the vehicle is undergoing. The safety systems of the present invention are well suited to such smart systems. For instance depending on the size and weight of an occupant, the smart system may determine that a limiting stop is or is not appropriate. Similarly, a limiting stop may be deployed on a front seat if the rear seat is occupied, but otherwise not deploy to allow more motion. Thus the invention also contemplates situations where when, and if, the safety systems are deployed is controlled by the smart system. Thus the rollover sensor signal will alert the system controller to the rollover event, but the safety device control signals will originate from the controller, which will decide which systems to deploy, how much to deploy them, and the time phasing of the deployment.

I claim:
1. A seat for a vehicle, comprising:
   a seat back,
   a seat cushion
   a manual reclining mechanism comprising a manually-engaged lock adapted to lock the seat in the desired reclining position when engaged and release the seat for reclining when disengaged, a rollover sensor,
   a first actuator in communication with the rollover sensor adapted to automatically recline the seat when triggered by a signal originating from the rollover sensor; and
   a second actuator in communication with the rollover sensor, adapted to automatically disengage the manually engaged lock when triggered by a signal originating from the rollover sensor.
2. The seat of claim 1, wherein the actuators are any combination of pyrotechnic pistons, motors or spring loaded.
3. The seat of claim 1, further comprising an integrated safety belt, with a pre-tensioner, wherein the pre-tensioner is triggered in response to a signal from the rollover sensor.
4. The seat claims 1, or 3, wherein the operation of the seat may be controlled by a smart safety system.
5. The seat of claim 4, wherein the rollover sensor signal alerts the smart safety system of a rollover condition, and all safety device control signals are generated by the smart safety system.
6. A seat for a vehicle, comprising:
   a seat back,
   a seat cushion
   means for manual adjustment of a seat reclining position, comprising a mechanism which locks the seat in the desired reclining position,
   a first actuator which reclines the seat,
   a second actuator which unlocks the reclining mechanism,
   a rollover sensor, wherein in response to a signal from the rollover sensor indicating the vehicle is in a rollover condition the reclining actuator and the unlocking actuator are engaged, such that the seat is rapidly reclined rearward: and,
   a recline position stop, and an actuator to move the stop, wherein in response to a signal from the rollover sensor indicating the vehicle is in a rollover condition the stop actuator is engaged, such that the seat can be reclined beyond the normal stop position.
7. A seat for a vehicle, comprising:
   a seat back,
   a seat cushion
   means for manual adjustment of a seat reclining position, comprising a mechanism which locks the seat in the desired reclining position,
   a first actuator which reclines the seat,
   a second actuator which unlocks the reclining mechanism; and,
   a rollover sensor, wherein in response to a signal from the rollover sensor indicating the vehicle is in a rollover condition the reclining actuator and the unlocking actuator are engaged, such that the seat is rapidly reclined rearward, wherein the second actuator is a spring loaded actuator comprising:
   a spring, and;
   a third actuator which drives a restraining mechanism, such that in normal vehicle operation the spring is held in an extended (compressed) position by the mechanism, wherein in response to a signal from the rollover sensor, the mechanism is removed from the spring allowing the spring to retract (extend).

8. The seat of claim 7 wherein the actuator which drives the restraining mechanism may be one of a solenoid, motor, or pyro device.

9. A seat for a vehicle, comprising:
a seat back,
a seat cushion
means for manual adjustment of a seat reclining position, comprising a mechanism which locks the seat in the desired reclining position,
a first actuator which reclines the seat,
a second actuator which unlocks the reclining mechanism,
a rollover sensor, wherein in response to a signal from the rollover sensor indicating the vehicle is in a rollover condition the reclining actuator and the unlocking actuator are engaged, such that the seat is rapidly, reclined rearward: and,
a recline position stop, and an actuator to insert the stop, wherein in response to a signal from the rollover sensor indicating the vehicle is in a rollover condition the stop actuator is engaged, such that the seat cannot be reclined beyond the inserted stop position.

10. The, seat of claim 9 wherein the stop is inserted when the seat reaches the desired point of recline.

11. The seat of claim 9 wherein when the seat reaches the desired point of recline, the stop is freed to move into the stop position and then locks into place.

12. The seat of claim 11 wherein the stop is a bar on a spring loaded pivot, configured such that an opening in the seat passes the bar at the desired recline point allowing the bar to pivot into place securing the seat.

13. The seat of claim 11 wherein the stop is a pin or pins which moves into a hole or holes when the pin and hole line up at the desired recline point.

14. A seat for a vehicle, comprising:
a seat back,
a seat cushion
means for manual adjustment of a seat reclining position, comprising a mechanism which locks the seat in the desired reclining position,
a first actuator which reclines the seat,
a second actuator which unlocks the reclining mechanism; and,
a rollover sensor, wherein in response to a signal from the rollover sensor indicating the vehicle is in a rollover condition the reclining actuator and the unlocking actuator are engaged, such that the seat is rapidly reclined rearward: and the seat is held in the reclined position after the operation of the actuators in response to the rollover signal.

15. The seat of claim 14 wherein the seat is held in the reclined position by re-engagement of the unlocking mechanism.

16. The seat of claim 15 wherein the unlocking mechanism is re-engaged by an additional actuator which re-engages the mechanism, the additional actuator triggered by a timer that is set to a time sufficient to allow for the seat to recline.

17. The seat of claim 15 wherein the locking mechanism is re-engaged by the release of the mechanism by the second actuator, at a measured position of the seat.

18. The seat of claim 14 wherein the seat is held in the reclined position by the operation of a another actuator which inserts a stop to secure the seat in the reclined position.

19. The seat of claim 18 wherein the stop is inserted after a predetermined time after the rollover sensor signal.

20. The seat of claim 18 wherein the stop is inserted at a measured position of the seat.

21. The seat of claim 14 wherein when the seat reaches the desired point of recline, a stop is freed to move into the stop position and lock into place.

22. The seat of claim 21 wherein the stop is a bar on a spring loaded pivot, configured such that an opening in the seat passes the bar at the desired recline point allowing the bar to pivot into place securing the seat.

23. The seat of claim 21 wherein the stop is a pin or pins which moves into a hole or holes when the pin and hole line up at the desired recline point.

24. A seat for a vehicle, comprising:
a seat back,
a seat cushion
means for manual adjustment of a seat reclining position, comprising a mechanism which locks the seat in the desired reclining position,
a first actuator which reclines the seat,
a second actuator which unlocks the reclining mechanism,
a rollover sensor, wherein in response to a signal from the rollover sensor indicating the vehicle is in a rollover condition the reclining actuator and the unlocking actuator are engaged, such that the seat is rapidly relined rearward; and,
a recliner spring, wherein the spring action is removed in response to a signal from the rollover sensor.

25. The seat of claim 24 wherein the spring action is removed by eliminating one or both spring action surfaces.

26. The seat of claim 24 wherein the spring action is removed by rendering the spring ineffective by pyro or chemical means.

* * * * *